(12) United States Patent
Peng et al.

(10) Patent No.: US 11,838,643 B2
(45) Date of Patent: Dec. 5, 2023

(54) INFORMATION PROCESSING METHOD AND ELECTRONIC APPARATUS

(71) Applicant: Lenovo (Beijing) Limited, Beijing (CN)

(72) Inventors: Shaopeng Peng, Beijing (CN); Zhenhua Zhang, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 45 days.

(21) Appl. No.: 17/550,397

(22) Filed: Dec. 14, 2021

(65) Prior Publication Data

US 2022/0311925 A1 Sep. 29, 2022

(30) Foreign Application Priority Data

Mar. 26, 2021 (CN) .......................... 202110328208.6

(51) Int. Cl.
*H04N 23/72* (2023.01)
*G06T 7/80* (2017.01)
*G06T 7/11* (2017.01)
*H04N 23/71* (2023.01)
*G06V 10/22* (2022.01)

(52) U.S. Cl.
CPC ............... *H04N 23/72* (2023.01); *G06T 7/11* (2017.01); *G06T 7/80* (2017.01); *G06V 10/22* (2022.01); *H04N 23/71* (2023.01); *G06T 2207/20021* (2013.01)

(58) Field of Classification Search
CPC ........ H04N 23/72; H04N 23/71; H04N 23/76; H04N 23/80; H04N 23/81; G06T 7/11; G06T 7/80; G06T 2207/20021; G06T 5/003; G06V 10/22
See application file for complete search history.

(56) References Cited

U.S. PATENT DOCUMENTS

2022/0270225 A1* 8/2022 Pham ...................... G06T 5/002
2023/0028315 A1* 1/2023 Shukla ..................... G06T 5/50

FOREIGN PATENT DOCUMENTS

| CN | 109410152 A | 3/2019 | |
| CN | 110910805 A | 3/2020 | |
| EP | 3992904 A1 * | 5/2022 | ............ G06T 5/002 |
| WO | WO-2022035267 A1 * | 2/2022 | |

OTHER PUBLICATIONS

"Image Restoration for Under-Display Camera"; Zhou et al (Year: 2020).*

* cited by examiner

*Primary Examiner* — Shahbaz Nazrul
(74) *Attorney, Agent, or Firm* — ANOVA LAW GROUP, PLLC (57) ABSTRACT

An information processing method includes obtaining an original image, obtaining an image processing parameter corresponding to the camera module, and processing the original image to obtain a target image based on the image processing parameter. The original image is a sensing-signal-array formed at a sensor array of a camera module in response to external light passing through the lens of the camera module. The image processing parameter is configured to compensate an influence on an image quality of the original image caused by the camera module. The image quality of the target image is higher than the image quality of the original image.

19 Claims, 4 Drawing Sheets

INFORMATION PROCESSING METHOD AND ELECTRONIC APPARATUS

CROSS-REFERENCE TO RELATED APPLICATION

This application claims priority to Chinese Patent Application No. 202110328208.6, filed on Mar. 26, 2021, the entire content of which is incorporated herein by reference.

TECHNICAL FIELD

The present disclosure generally relates to the data processing technology field and, more particularly, to an information processing method and an electronic apparatus.

BACKGROUND

In practical applications, an image optimization is usually based on pixels or color features of the image. Such image optimization results may not meet actual image processing requirements.

SUMMARY

Embodiments of the present disclosure provide an information processing method. The information processing method includes obtaining an original image, obtaining an image processing parameter corresponding to the camera module, and processing the original image to obtain a target image based on the image processing parameter. The original image is a sensing-signal-array formed at a sensor array of a camera module in response to an external light passing through a lens of the camera module. The image processing parameter is configured to compensate an influence on an image quality of the original image caused by the camera module. The image quality of the target image is higher than the image quality of the original image.

Embodiments of the present disclosure provide an electronic apparatus, a camera module, and a processor. The camera module is configured to obtain an original image in response to an external light passing through a lens of the camera module. The original image is formed at a sensor array of the camera module. The processor is configured to obtain an image processing parameter corresponding to the camera module, and process the original image to obtain a target image. The image processing parameter is configured to compensate for an impact of the camera module on an image quality of the original image. The image quality of the target image is higher than the image quality of the original image.

DETAILED DESCRIPTION OF THE EMBODIMENTS

The technical solutions and features of the present disclosure are described clearly and entirely according to the accompanying drawings.

Therefore, the present description should not be regarded as a limitation but merely as an example of embodiments of the present disclosure.

The present disclosure relates to the data processing technical field, more particularly, to an information processing method and a computer-readable storage medium.

In practical applications, an optimization process for images is usually performed through various software algorithms or software tools. According to data features and data status of the image, operations such as a color optimization, a target recognition, an edge recognition, and a repair and stretch are performed on the image. However, the above various operations are performed according to the features of the image. If the image has poor quality or severe deterioration, any optimization processing performed to improve the image through the above-described methods is limited. Moreover, the above-described image optimization process may not reflect the influence of various factors during the image forming process of the image quality.

Embodiments of the present disclosure provide an image processing method. According to the image processing parameters of a camera module, the data processing method processes an original image obtained by the camera module to obtain a target image. Since the image processing parameters objectively reflect a function of the camera module in an original image formation process, the original image may be processed through image processing parameters, so as to compensate an influence by the camera module on the image quality of the original image. In some embodiments, the image processing method provided by embodiments of the present disclosure may optimize and compensate the original image according to the objective factors of the camera module during the original image formation process, thereby improving the optimization influence of the original image and further improving the image quality of the target image.

In some embodiments, the image processing method provided by embodiments of the present disclosure may be implemented by a processor of an electronic apparatus. The above-described processor may include at least one of an application specific integrated circuit (ASIC), a digital signal processor (DSP), a digital signal processing device (DSPD), a programmable logic device (PLD), a field programmable gate array (FPGA), a central processing unit (CPU), controller, microcontroller, or microprocessor.

Figure 1:
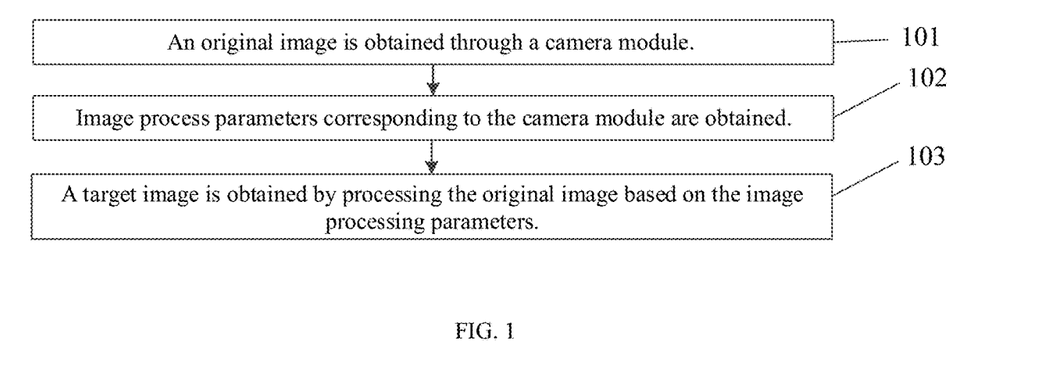
FIG. 1 illustrates a schematic flowchart of a first information processing method according to some embodiments of the present disclosure.

FIG. 1 is a schematic flowchart of a first image processing method according to some embodiments of the present disclosure. As shown in FIG. 1, the image processing method may include process 101 to process 103.

At 101, the original image is obtained by the camera module.

In some embodiments, the original image includes a sensing signals array formed at the sensor array of the camera by external light passing through the lens of the camera module and module.

In some embodiments, the camera module may include a lens, and a sensor array arranged opposite to the lens. For example, the sensor array may be an image sensor.

In some embodiments, the camera module may further include the DSP, where the DSP may perform a rapid optimization process on the sensing-signal-array of the sensor array.

In some embodiments, the lens of the camera module may include a standard lens, a wide-angle lens, a telephoto lens, a zoom lens, etc.

In some embodiments, the lens of the camera module may be covered with a protection film. The protection film may also affect transmission of an external light.

In some embodiments, the sensing-signal-array may include all sensing signals formed at the sensor array by the external light.

In some embodiments, the sensing-signal-array may include sensing signals formed by external light in a designated region of the sensor array. For example, the designated region may be a geometric center region of the sensor array.

In some embodiments, a number of the original image may be one.

In some embodiments, the original image may include multiple images continuously collected by the camera module.

In some embodiments, the external light may be incident to a lens at any incident angle. For example, for the same lens, a focal length of light incident at different angles may be different.

At 102, the image processing parameters corresponding to the camera module are obtained.

In some embodiment, the image processing parameters are configured to compensate for the impact of the camera module on the image quality.

In some embodiments, the image processing parameters may include parameters of lens quality. For example, the image processing parameters may include a light transmission level and a light reflection level of the lens.

In some embodiments, the image processing parameters may include the parameters of a lens structure, such as a concavity and convexity level of the lens, and an influence photosensitive region of the lens, etc.

In some embodiments, the image processing parameters may include parameters of physical components of the lens, such as the lens may be composed of optical glass or resin.

In some embodiments, the image processing parameters may include the parameters of optical characterizations of the lens, such as a focus distance, an angle of view, a related hole diameter, an aperture parameter, etc.

In some embodiments, the image processing parameters may include processing capability parameters of the lens for the external light. For example, the processing capability parameter of the lens for the external light may be evaluated by the number of lines that the lens may present within a millimeter.

In some embodiments, the image processing parameters may include MTF parameters. For example, the MTF parameter may be expressed in a form of a matrix, that is, each point of the lens has a corresponding MTF parameter. In practical applications, the MTF parameters represent a resolution of the lens, thereby playing an important role in the image formation process.

In some embodiments of the present disclosure, to compensate an influence on the image quality of the formed original image caused by the lens, the MTF parameter may be processed to obtain the image processing parameters.

In some embodiments, the image processing parameters may be obtained by matrix inversion of the MTF parameters.

In some embodiments, compensation for the impact of the image quality may include improving the clarity of the image, enhancing a brightness of the image, improving a contrast of the image, highlighting details of the image, etc.

At 103, the original image is processed based on the image processing parameters to obtain the target image.

In some embodiments, the image quality of the target image is higher than the image quality of the original image.

In some embodiments, the processing of the original image based on the image processing parameters may be performed in any of the following ways.

Matrix multiplication calculation is performed on the matrix corresponding to the image processing parameters and the array or matrix corresponding to the original image is performed to realize a correction of the original image.

The matrix corresponding to the correction parameter is determined. The array or matrix corresponding to the original image is corrected based on the matrix corresponding to the correction parameter and the matrix corresponding to the image processing parameters.

In some embodiments, a format of the target image and the original image may be different, for example, the original image may be a *.jpg format, and the target image may be in a *.mp4 format.

In some embodiments, data amount of the target image may be different from the data amount of the original image. For example, at least two original images may be merged and optimized, and the target image may be obtained according to the result of the merged and optimized processing.

In some embodiments, the at least two original images are continuously collected by the camera module. The at least two original images may carry same or different features of a same target object. For example, a first original image carries a front feature information of the designed position of the target object, and the second original image carries a side feature information of the designed position of the target object. Then, an optimization process is performed on the first original image and the second original image, respectively. The front feature information obtained from the process and the side feature information obtained from the process are merged and spliced to obtain the target image. As such, the target image may carry clear and fine features of the designed position.

In some embodiments, the image quality of the target image may include the clarity of the target image, the resolution, the contrast, and brightness, etc. The clarity, the resolution, the contrast, and the brightness of the target image may be higher than the corresponding features of the original image.

The image processing method provided by the embodiments of the present disclosure may perform compensation processing on the original image obtained through the camera module according to the image processing parameters to obtain the target image after obtaining the image processing parameters corresponding to the camera module, which improves the image quality of the target image relative to the original image. Since the image processing parameters of the camera module are directly related to the original image formation process, the image processing parameters directly affect the image quality of the original image. Therefore, an influence of interference factors of the original image during the original image formation process may be obtained through the image processing parameters, such that the image quality of the original image may be objectively realized to substantially improve the image quality of the original image by performing the processing the original image through the image processing parameters.

Figure 2:
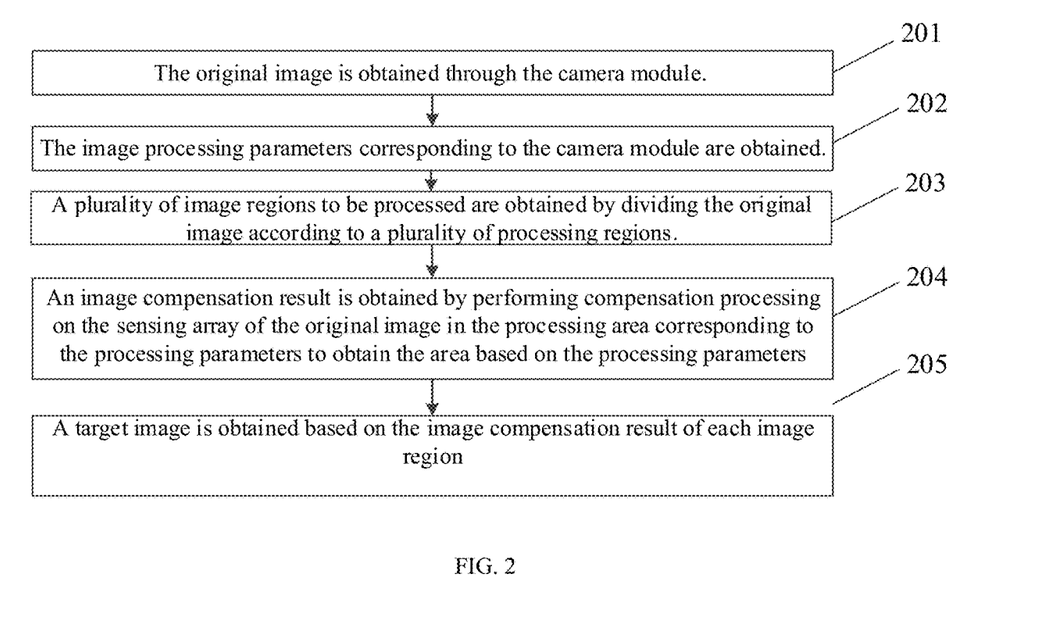
FIG. 2 illustrates a schematic flowchart of a second information processing method according to an embodiment of the present disclosure.

Based on the above embodiment, the embodiment of the present disclosure provides a second image processing method. FIG. 2 is a schematic flowchart diagram showing the second image processing method. As shown in FIG. 2, the flowchart includes process 201 and process 205.

At 201, the original image is obtained by the camera module.

In some embodiments, the original image is the sensing-signal-array formed at the sensor array of the camera module by external light transmitted through the lens of the camera module.

At 202, the image processing parameters corresponding to the camera module is obtained.

In some embodiments, the image processing parameter is configured to compensate for the impact of the camera module on the image quality of the original image.

In some embodiments of the present disclosure, the image processing parameters may include a plurality group of processing parameters. Each processing parameter group may include a plurality of processing data. The plurality of processing parameters and a plurality of processing regions include a first association relationship.

In some embodiments, the image processing parameters may only include a group of image processing parameters, for example, only one of the image processing parameters includes the MTF parameter matrix of the lens.

In some embodiments, the plurality group of processing parameters of the image processing parameters is obtained by dividing the matrix corresponding to the image processing parameters.

Correspondingly, each group of processing parameters includes the plurality of the processing data. The processing data may include a plurality of the matrix elements of the image processing parameters matrix, and the matrix elements may be continuously distributed in the image processing parameters matrix.

In some embodiments, the image processing parameters may include a plurality group of processing parameters. The processing parameters may be obtained by matrix decomposition of the image processing parameters matrix. For example, the matrix decomposition may include a triangular decomposition, an orthogonal decomposition, etc.

In some embodiments, the processing region may be in a designed shape. For example, the designed shape may be a regular geometric shape.

In some embodiments, the plurality of processing regions may be adjacent.

In some embodiments, the first association relationship may include a one-to-one correspondence between processing parameters and processing regions. For example, a first group of processing parameters corresponds to a first processing region. An Nth group of processing parameters corresponds to an Nth processing region, where N is an integer greater than 1.

In some embodiments, the first association relationship may include many-to-many or many-to-one correspondence between processing parameters and processing regions.

At 203, the original image is divided based on the plurality of processing regions, so as to obtain a plurality of image regions to be processed.

In some embodiments, a pixel distribution of the original image may be consistent with the distribution of the sensor array.

In some embodiments, the geometric shape and size of the original image may be consistent with the sensor array.

In some embodiments, the original image may be formed at the center region of the sensor array. For example, the original image may be formed in a central region of the sensor array in a regular geometric shape.

In some embodiments, the image region to be processed may be a plurality of adjacent image regions obtained by dividing the original image.

In some embodiments, the image region to be processed may not be adjacent to each other.

In some embodiments, the number of the image region to be processed may be the same as the number of the process region.

In some embodiments, the shape of the image region to be processed may be the same or similar to the shape of the processing region.

In some embodiments, a processing region may be a physical region of the sensor array.

In some embodiments, the processing region may be the physical region of the sensor array with a regular geometric shape.

In some embodiments, the processing region may be the physical region of the sensor array independent from each other.

In some embodiments, a Kth physical region and a K+1th physical region may be adjacent. For example, at least one edge of the Kth physical region may be adjacent to at least one edge of the K+1th physical region. For example, each edge of the Kth physical region may closely fit each edge of the K+1th physical region, where K is an integer greater than zero.

In some embodiments of the present disclosure, the processing region may be obtained through process A1 and process A2.

At A1, a gradient information of the image processing parameters is obtained.

In some embodiments, the gradient information of the image processing parameters may be closely related to the material, a workmanship, a geometric shape of the lens.

In some embodiments, the gradient information of the image processing parameters may be continuous or segmented continuous.

In some embodiments, the gradient information of the image processing parameters may characterize the changes of the light processing capabilities of each region of the lens.

In some embodiments, the gradient information of the image processing parameters corresponding to the geometrically symmetrical region of the lens may be consistent.

In some embodiments, the gradient information of the image processing parameters corresponding to each incident point of the lens may be different.

In some embodiments, the gradient information of the image processing parameters may include a matrix that carries the MTF parameter information.

In some embodiments, the gradient information of the image processing parameters may be determined after the production of the lens is completed.

In some embodiments, the gradient information of the image processing parameters may be obtained by testing a light processing ability of the lens.

In some embodiments of the present disclosure, the image processing parameters include a first light processing parameter and a second light processing parameter. The first light processing parameter includes a processing parameter of external light by the lens. The second light processing parameter includes a processing parameter of external light by the lens.

In some embodiments, the first light processing parameter may include the processing parameters of the lens corresponding to the external light. For example, the first light processing parameter may be an inverse matrix of the matrix corresponding to the MTF parameter of the lens.

In some embodiments, a physical assembly configured to cover the lens may include a protection film of the lens.

In some embodiments, the physical assembly configured to cover the lens may be configured as an assembly to perform preliminary processing on the external light incident to the lens, for example, the physical assembly may be configured to weaken a backlight incident at a certain angle.

In some embodiments, the physical assembly configured to cover the lens may be configured to perform a preliminary filter on the external light incident to the lens, for example, the physical assembly may be configured to filter a spectrum in a certain frequency range.

In some embodiments of the present disclosure, if the camera module is located below the display screen, the above physical assembly may be the display screen to cover the camera module. The image processing parameters may also be configured to compensate an impact on the image quality caused by a physical structure of a portion of the display screen corresponding to the camera module.

The arrangement method that the camera module arranged below the display screen corresponds to the CUD in practical application.

Figure 3:
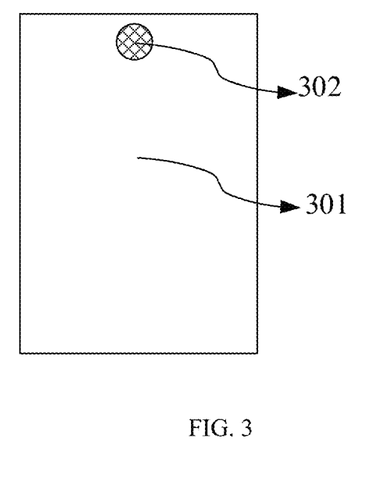
FIG. 3 illustrates a schematic diagram of a division structure showing a display screen in a Camera Under Display (CUD) mode in related technology.

FIG. 3 is a schematic divided structural diagram of the display screen in CUD mode.

As shown in FIG. 3, in CUD mode, the display screen is divided into two regions, that is, a first region 301, and a second region 302. The first region 301 is configured to display data, and the second region 302 is a CUD region, that is a camera module corresponding to the region is arranged inside. When collecting images is not needed, the second area 302 may realize the data display function at the same time as the first region 301. When the images need to be collected, the second area 302 no longer displays data and switches to a light-transmission state. As such, the second region 302 may receive external light, and then transmit a certain amount of the external light to the camera module.

In practical applications, the second region 302 needs to realize the data display function. Therefore, wiring configured to display data are arranged at the internal space of the display screen corresponding to the second area 302. When the electronic apparatus is switched to the image collection state, wiring arranged at an internal space of the display screen corresponding to the second region 302 may cause certain interference to the external light incident on the second region 302, such that the image collected by the camera module is blurred.

In some embodiments, the physical structure of the display screen portion corresponding to the camera module may include a physical structure of the above-described wiring provided in the display screen corresponding to the camera module. For example, the physical structure of the above-described wiring may include a density of wiring, a light transmittance, and a light sensitivity parameter etc.

Figure 4:
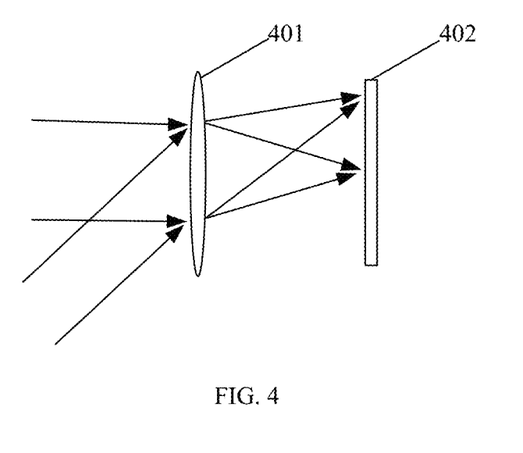
FIG. 4 illustrates a schematic diagram of a first principle for changing an imaging quality in the CUD mode.

FIG. 4 is a schematic diagram showing a first principle of the image quality change in the CUD mode in the existing technology.

As shown in FIG. 4, the external light received by a lens 401 is the light that has been reflected, refracted, and diffracted by various wiring corresponding to the second region 302 of the display screen. Therefore, after the interference of the above-described wiring, an incident angle of the light at the lens 401 becomes random and scattered. After the light is processed by the lens 401, the quality of the sensing signal reaching the sensor array 402 is significantly reduced.

Figure 5A:
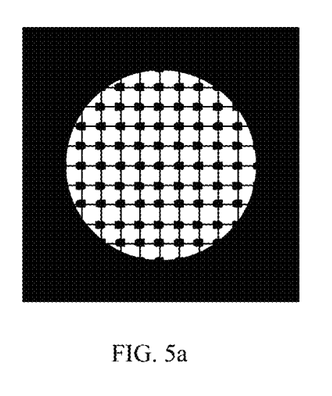
FIG. 5a illustrates a schematic diagram of a second principle for changing the imaging quality in the CUD mode.

FIG. 5a is a schematic diagram showing a second principle of the image quality change in the CUD mode in the related art.

Figure 5B:
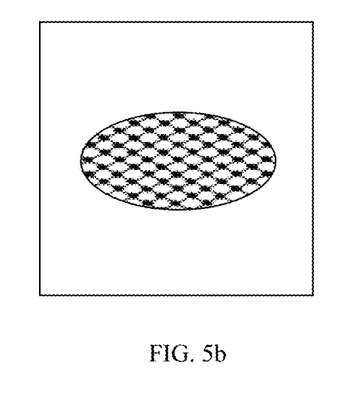
FIG. 5b illustrates a schematic diagram of a third principle for changing the imaging quality in the CUD mode.

FIG. 5b is a schematic diagram of a second principle showing the image quality change in the CUD mode in the related art.

In an ideal situation, if the incident light is not severely interfered with by the wiring, then after the external light enters the lens 401, the image formed at the sensor array 402 is a regular circle as shown in FIG. 5a, and the dark color dot matrix correspond to an actual distribution state of opaque wirings. In practical applications, since the wiring at the incident light causes various interference influences, the angle between the incident light and the lens 401 is more random, which is equivalent to the deformation of an entrance pupil of the camera assembly. The truly effective entrance pupil is a projection of the incident light in the direction perpendicular to the sensor array 402, that is, as shown in FIG. 5, the shape of the projection on the sensor array 402 and a relative distance between the dots are changed significantly, and the clarity of the overall dots is also decreased significantly.

In some embodiments, an effective solution to improve the image mode in the CUD mode does not exist. However, in the image processing method provided by embodiments of the present disclosure, the image processing parameters may include the second region 302, that is, the diffraction influence of the wiring of the CUD for the external light. Therefore, when processing the original image based on the image processing parameters, the influence of the diffraction influence of the CUD wiring may be weakened for the image collection, thereby compensating for the impact of the physical structure of the display screen on the image quality.

In some embodiments, the gradient information of the collected image processing parameters in process A1 may be implemented by process B1 to process B2.

At B1, the first gradient information of the first processing parameter and the second gradient information of the second processing parameter is obtained, In some embodiments, a first matrix corresponds to a first light processing parameter, and a second matrix corresponds to a second light processing parameter. The two matrixes may be the same.

In some embodiments, change rules of the first gradient information and the second gradient information may be consistent. For example, the first gradient information and the second gradient information may both indicate a light transmission efficiency change at the geometric center position of the camera module.

In some embodiments, the change rule of the first gradient information and the second gradient information may be different.

In some embodiments, the first gradient information and the second gradient information may be determined after completing the CUD mode arrangement.

At B2, the gradient information of the image processing parameters is obtained according to the first gradient information and the second gradient information.

In some embodiments, based on the first gradient information and the second information, the gradient information of the image processing parameters may be obtained by the following implementation manners.

An improvement level or an improvement dimension of the image quality by the first light processing parameter is analyzed to obtain the first data. The improvement level or the improvement dimension of the image quality of the second light processing parameter is analyzed to obtain the second data. According to the first data and the second data, a first weight corresponding to the first gradient information and a second weight corresponding to the second gradient information are determined. Then, a weighted calculation is performed on the first gradient information and the second gradient information according to the first weight and the second weight to obtain the gradient information of the image processing parameters.

In some embodiments, the improvement level of the image quality by the first light processing parameter and the improvement level of the image quality by the second light processing parameter may be different.

In some embodiments, the improvement dimension of the image quality by the first light processing parameter and the improvement degree of the image quality by the second light processing parameter may be different. For example, the first light processing parameter may improve the clarity of the image, and the second light processing parameter may improve the brightness of the image.

In some embodiments, based on the first gradient information and the second gradient information, the gradient information of the image processing parameters may further be obtained by any of the following implementation manners.

A corresponding superposition operation is performed on the elements at the first gradient information and the second gradient information to obtain the gradient information of the image processing parameters.

An optical characteristic parameter of the physical assembly covering the lens is analyzed to determine a first threshold that the environmental parameters have a significant impact on the image processing influence of the physical assembly. When the actual value corresponding to the environmental parameter is greater than or equal to the first threshold, the gradient information of the image processing parameters may be obtained based on the first gradient information and the second gradient information. Oppositely, when the actual value corresponding to the environmental parameter is less than the first threshold, the gradient information of the image processing parameters may be obtained based on the first gradient information.

In some embodiments of the present disclosure, the gradient information of the image processing parameters may not only include the first gradient information corresponding to the lens, but also the second gradient information corresponding to the physical assembly covering the lens. As such, when the original image is processed through the above image processing parameters, full consideration is given to the influence of the lens and the physical assembly covering the lens during the external light transmission process and the original image formation process, thereby objectively and comprehensively improving the image quality of the target image.

In some embodiment of the present disclosure, when the processing regions are physical regions of the sensor array, the image processing method provided by embodiments of the present disclosure may further include process C1 to process C2.

At C1, a structure parameter of the camera module is obtained.

In some embodiments, the structure parameter of the camera module includes at least a distance range between the camera assembly of the camera module and the sensor array.

In some embodiments, the camera assembly includes the lens.

In some embodiments, the distance range between the camera assembly and the sensor array may be the distance range between the geometric center position of the camera assembly and the geometric center position of the sensor array.

In some embodiments, the distance range between the camera assembly and the sensor array may be fixed to the camera module. For example, the actual distance between the camera assembly and the sensor array may be changed with a mechanical movement of the camera assembly. For example, the focusing operation of the camera module may change the distance between the camera assembly and the sensing assembly.

At C2, the sensor array is divided based on the structure parameter of the camera assembly to obtain the processing regions. In some embodiments, the sensor array is divided into the processing regions based on the structure parameter of the camera assembly.

In some embodiments, the process C2 may be implemented in the following manners.

Based on the actual distance between the camera assembly and the sensing assembly and the structure parameters of the camera module, the processing regions are obtained by dividing the sensor array.

For example, the influence level of each distance value of the structural parameters on the image quality may be determined by measurements. Therefore, according to the actual distance and the focal length of the structural parameters, the influence level of the actual distance on the image quality may be determined. Then, according to the influence level, how to deal with the division of regions is determined. For example, when the actual distance is greater than the focal length, the actual distance represents a more obvious influence on the image quality, then divided multiple processing regions may be obtained.

In some embodiments, process C2 may be implemented in the following manners.

Based on a structure parameter, the optical parameter of the camera assembly, and the optical parameter of the sensing assembly, the processing regions are obtained by dividing the sensor array.

For example, the optical parameters of the camera assembly may be determined by factors such as the material, the process, and a three-dimensional geometry of the camera assembly.

For example, the optical parameters of the sensing assembly may include a sensing speed of the sensing assembly to light, a sensing influence on light with different intensities, etc.

For example, according to the optical parameters of the camera assembly and the optical parameters of the sensing assembly, a first light is obtained after the camera assembly processing the external light and a second light is required for the sensing assembly to obtain a higher quality original image may be determined.

For example, according to the first light, the second light, and the structure parameters of the camera module, how to divide the sensor array to obtain the processing regions may be determined. For example, when the intensity of the first light is less than the intensity of the second light, the influence of the structural parameters of the camera module on the intensity of the first light may be combined to determine that the sensor array can be divided to more processing regions, so as to weaken the influence of weak light intensity of the first light on image quality.

In some embodiments of the present disclosure, when the processing regions are physical regions of the sensor array, the image processing method provided in the embodiments of the present disclosure may further include the process D1 to the process D2.

At D1, a calculation load parameter and an image display parameter are obtained.

In some embodiments, the calculation load parameter includes the calculation throughput of the electronic apparatus to which the camera module belongs. The image display parameter includes a resolution parameter of a display module of the electronic apparatus.

In some embodiments, the electronic apparatus may include a mobile electronic apparatus, such as a smartphone.

In some embodiments, the electronic apparatus may include a computer apparatus, such as a laptop computer.

In some embodiments, the electronic apparatus may be integrated with a camera module.

In some embodiments, the camera module is arranged outside the electronic apparatus. A communication connection may be built between the electronic apparatus and the camera module.

In some embodiments, the calculation load parameter may include an instantaneous peak value of the calculation throughput of the electronic apparatus or an average value of the calculation throughput.

In some embodiments, the image module may include a display screen of the electronic apparatus.

In some embodiments, the image display parameter may include the color range, resolution, etc. of the electronic apparatus output. Where, the color range may include whether to output in black, white, gray, or color.

At D2, the sensor array is divided based on the calculation load parameter and/or the image resolution parameter, to obtain the processing regions.

In some embodiments, based on the calculation load parameters, dividing the sensor array to obtain the processing regions may be implemented in the following manners.

Based on the calculation load parameters, the number of calculations that the processor of the electronic apparatus may perform in a unit time is determined, and then the sensor array is divided according to the number of calculations to obtain the processing regions. For example, if the number of operations described above is less than or equal to the second threshold, a smaller number of processing regions may be obtained from dividing the sensor array. Correspondingly, the number of groups of processing parameters obtained by dividing the image processing parameters may be relatively smaller. If the number of operations described above is greater than the second threshold, a larger number of processing regions may be obtained from dividing the sensor array, correspondingly, the number of groups of processing parameters obtained by dividing the image processing parameters may also be relatively large.

The image processing region obtained by the image processing method provided by the embodiment of the present disclosure is configured to match a processing power and a calculation power of the electronic apparatus, thereby reducing the probability of jams or image processing failures caused by the amount of image processing data exceeding the computing power of the electronic apparatus.

In some embodiments, based on the image resolution parameter, dividing the sensor array to obtain the processing regions may be implemented in the following manners.

Based on the image resolution parameter, the data amount displayed at the display module of the electronic apparatus is determined. When the data amount is less than or equal to a third threshold, a smaller number of processing regions may be obtained from dividing the sensor array. Oppositely, if the data amount is greater than the third threshold, a larger number of processing regions may be obtained from dividing the sensor array.

The image processing method provided by the embodiments of the present disclosure enables the result of image processing to match the display capability of the display assembly of the electronic apparatus by performing the above operations. Therefore, the image process method reduces the possibility that the processed target image cannot be loaded and displayed normally after the fine processing at an early stage.

In some embodiments, based on the image resolution parameter and the calculation load parameter, dividing the sensor array to obtain the processing regions may be implemented in the following manners.

Based on the image resolution parameter and calculation load parameter, the number of image data processing displayed supported by the electronic apparatus is determined. The number of the divided processing regions at the sensor array is determined according to the number of the image data processing. For example, when the number of image data processing is greater than or equal to a fourth threshold, more processing regions may be obtained from dividing the sensor array. Oppositely, when the number of image data processing is less than the fourth threshold, a smaller number of processing regions may be obtained.

According to the above operations, when obtaining the divided processing regions, the image processing method provided by the embodiments of the present disclosure may take into account the resolution parameters of the electronic apparatus and the calculation load parameters of the electronic apparatus. As such, the processing method improves image quality according to a plurality of dimensions of the electronic apparatus and the image processing parameters, thereby improving the image quality, and reducing the probability of abnormality in the process of image quality improvement.

In some embodiments, the above-described second threshold, the third threshold, and the fourth threshold may be fixedly arranged at the electronic apparatus or may be adjustable.

At A2, based on the gradient information of the image processing parameters, the sensor array is divided to obtain the processing regions.

In some embodiments, based on the gradient information of the image processing parameter, dividing the sensor array may be implemented in any of the following manners.

The change rule of the gradient information of the image processing parameters is determined, and the processing regions are obtained from dividing the sensor array according to the change rule of the gradient information.

The gradient information of the image processing parameters is calculated to determine a fifth threshold. a continuous region at the corresponding sensor array having image processing parameters with gradient information less than the fifth threshold and is arranged/identified as one processing region. A continuous region at the corresponding sensor array having image processing parameters with the gradient information greater than or equal to the fifth threshold is arranged/identified as another processing region when dividing the sensor array. For example, the specific value of the fifth threshold may be determined according to actual image collection requirements or user selections.

In some embodiment of the present disclosure, a plurality of the processing regions may be a set of concentric geometric shapes centered at the geometric center of the sensor array. For example, the plurality of processing regions may be circular rings centered at the geometric center of the sensor array.

At 204, a compensation process is performed on the image region to be processed corresponding to the processing parameters to obtain the region image compensation results based on the processing parameters, In some embodiments, the process 204 may be implemented in the following manners.

Pixel information corresponding to the image region to be processed is obtained. Based on the processing parameters, a multiplication calculation is performed on the above-described pixel information matrix or array to obtain the compensation result of the regional image.

For example, in the above multiplication calculation process, a weighted parameter may also be added, wherein the weighted parameter is configured to change the compensation level of the processing parameter of the image region to be processed.

For example, the weighted parameters corresponding to different image regions to be processed may be different.

In some embodiments, the regional image compensation result may be image data that matches the shape and size of the image region to be processed.

The image processing method may further include the following processes.

A brightness parameter for characterizing the brightness of the external environment is obtained.

In some embodiments, the brightness parameter may be an instantaneous brightness parameter of the brightness of the external environment.

In some embodiments, the brightness parameter may include an average brightness of the external environment in a certain period.

In some embodiments of the present disclosure, if the brightness parameter is greater than a brightness threshold, the image processing parameter of a first combination corresponding to the camera module is obtained. If the brightness parameter is less than or equal to the brightness threshold, the image processing parameter of a second combination corresponding to the camera module is obtained.

The image processing parameter of the first combination includes the plurality group of processing parameters. The image processing parameter of the second combination includes the plurality group of processing parameters. The number of processing regions corresponding to the image processing parameters of the second combination is greater than the number of processing regions corresponding to the image processing parameters of the first combination.

In some embodiments, the brightness threshold may be fixedly set at the camera module.

In some embodiments, the brightness threshold may be changed with the use time of the camera module. For example, the brightness threshold may be changed with the lens material ages, and the brightness threshold may be adjusted adaptively.

In some embodiments of the present disclosure, the number of processing regions corresponding to the image processing parameters of the second combination is greater than the number of processing regions corresponding to the image processing parameters of the first combination. As such, under a lower brightness environment, a larger number of image regions to be processed may be determined according to a larger number of the processing parameters. Correspondingly, the corresponding image regions to be processed are processed according to a larger number of processing parameters, so as to more finely compensate for the image quality of the camera module, thereby improving the image quality of the target image.

In some embodiments of the present disclosure, a field of view of the lens and a plurality sets of processing parameters may have a second corresponding relationship.

In practical applications, the process for obtaining the external light from the lens of the camera module and the original image is closely related to the incident angle of the external light. When the incident angle of the external light is within the field of view of the lens, the lens may collect the external light and transmit it to the sensor array. Oppositely, if the incident angle of the external light is outside the field of view of the lens, the lens may not be able to collect the external light.

In some embodiments of the present disclosure, a plurality sets of the processing parameters may be configured to evaluate the influences of the image quality according to the different incident angles of the external light. In practical applications, the MTF parameter matrix may be divided to obtain a plurality of the MTF sub-matrices. These sub-matrices may reflect the change of the sensing signal on the sensor array when the incident light from different angles is sensed.

In some embodiments, the second corresponding relationship may indicate the correspondence relationship between the incident angle and the MTF parameter matrix within the field of view of the lens. The incident angle is represented in a unit of step angle. For example, a designated step angle may be 5° or 10°. For example, the designated step angle may be adjustable.

In some embodiments, a first incident angle within the field of view of the lens corresponds to a first MTF parameter matrix. A second incident angle may correspond to a second MTF parameter matrix.

Correspondingly, to compensate for the sensing influence of the lens on the incident light at the first incident angle, the first MTF parameter matrix may be divided by a method that is similar to the above-described embodiment to obtain a plurality of first MTF sub-parameter matrices. Then, based on the plurality of the first MTF sub-parameter matrices, processes are performed on the plurality of image regions to be processed obtained by dividing the original image, so as to obtain a target image with improved image quality.

In some embodiments of the present disclosure, when the external light is collected, the incident angle of the external light may be preliminarily determined, and then the corresponding image processing parameters may be determined according to the matching level between the incident angle and the field of view in the second corresponding relationship. Then, the original image corresponding to the external light incident at the angle is optimized according to the corresponding image processing parameters. As such, the corresponding image processing parameters are determined according to the incident angle of the external light, such that more targeted image optimization may be realized, which better improves the image quality of the target image.

At 205, the target image is obtained based on the image compensation result of each image region.

In some embodiments, the target image may be obtained in the following manners.

The image compensation results of each area may be spliced together to obtain the target image.

Edge information of the image compensation result of each image region is obtained, and the target image may be obtained according to the edge information and the image compensation result of each image region.

For example, the edge information of the image compensation result of each r image region may include the pixel information of the image compensation result of each image region and coordinate information of the pixels.

For example, a stitching method between the regional image compensation results may be determined according to the coordinate information of the pixels. According to the pixel information of the regional image compensation result, it can be determined whether the pixel smoothing processing needs to be performed on the pixel information of the edge position when stitching multiple regional image compensation results to reduce the problem of excessive pixel gradient of the target image.

Figure 6:
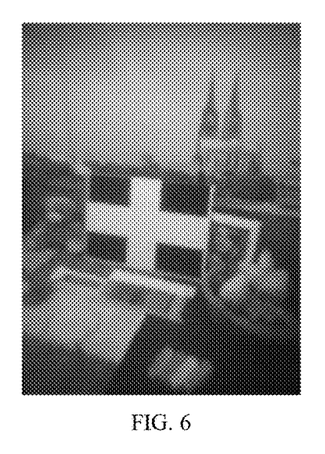
FIG. 6 illustrates a schematic diagram of an original image according to some embodiments of the present disclosure.

FIG. 6 is a schematic diagram of the original image according to some embodiments of the present disclosure.

As shown in FIG. 6, the clarity of the original image is weak, and the distinction between different target objects is not obvious enough.

FIG. 7a to FIG. 7e are schematic principle diagrams showing the division of the original image to obtain a first image region to be processed to a fifth image area to be processed according to some embodiments of the present disclosure.

Figure 7A:
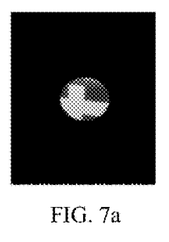
FIG. 7a illustrates a schematic principle diagram showing a first image region to be processed obtained from dividing the original image according to some embodiments of the present disclosure.
Figure 7B:
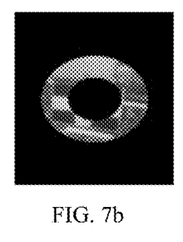
FIG. 7b illustrates a schematic principle diagram showing a second image region to be processed obtained from dividing the original image to be processed according to some embodiments of the present disclosure.
Figure 7C:
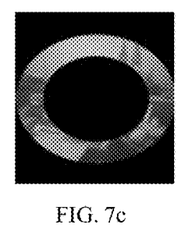
FIG. 7c illustrates a schematic principle diagram showing a third image region to be processed obtained from dividing the original image to be processed according to some embodiments of the present disclosure.
Figure 7D:
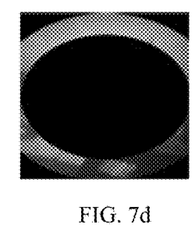
FIG. 7d illustrates a schematic principle diagram showing a fourth image region to be processed obtained from dividing the original image to be processed according to some embodiments of the present disclosure.
Figure 7E:
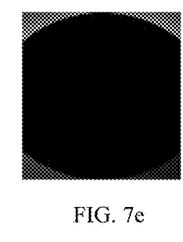
FIG. 7e illustrates a schematic principle diagram showing a fifth image region to be processed obtained from dividing the original image to be processed according to some embodiments of the present disclosure.

As shown in FIG. 7a, the first image region to be processed may be a circular region centered at the geometric center of the original image. As shown in FIG. 7b, the second image region to be processed may be an annular area with the same geometric center as the center of the first image area to be processed. FIG. 7c to FIG. 7e respectively shows a third image area to be processed, a fourth image area to be processed, and a fifth image area to be processed that are geometrically centered with the center of the first image area to be processed.

As shown in FIG. 7a to FIG. 7e, the characteristic information carried by different image regions to be processed is different, and the sharpness of different image regions to be processed is also different. In some embodiments, the collection center of the sensor array, that is, the geometric center corresponding to the original image may be configured as the center for dividing the original image to obtain the image regions to be processed.

Figure 8:
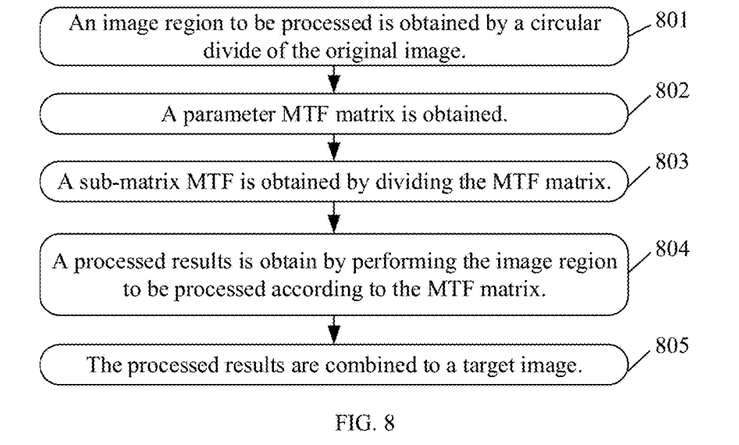
FIG. 8 illustrates a schematic flowchart diagram showing a process of processing the original image based on a Modulation Transfer Function (MTF) parameter matrix to obtain a target image according to some embodiments of the present disclosure.

FIG. 8 is a schematic flowchart of processing an original image based on an MTF parameter matrix to obtain a target image according to some embodiments of the present application. As shown in FIG. 8, the process may include process 801 to process 805.

At 801, a circular segmentation may be performed on the original image to obtain the image region to be processed.

For example, the circular segmentation of the original image is performed with the geometric center of the original image as the center and the processing region as the basis.

At 802, the MTF parameter matrix is obtained.

For example, the order of the process 801 and process 802 is adjusted one after another or may be executed synchronously, which is not limited by the embodiment of the present disclosure.

At 803, the MTF parameter matrix is divided to obtain the MTF sub-parameter matrix.

For example, the division of the MTF parameter matrix may be performed according to the processing region.

At 804, the image region to be processed is processed according to the MTF sub-parameter matrix to obtain a processing result.

For example, the inverse matrix of the MTF sub-parameter matrix may be obtained first, and then the corresponding image region to be processed may be processed according to the inverse matrix of the MTF sub-parameter matrix.

At 805, the processed results are combined to form the target image.

In some embodiments of the present disclosure, the above-described processing process weakens the lens and the physical assembly covering the lens, or the influence of the lens on the image quality of the original image, thereby improving the quality of the original image.

For the image processing method provided by the embodiments of the present disclosure, in the CUD mode, when the image processing parameter is the MTF parameter matrix, a fuzzy inverse operation in the frequency domain is performed on the original image through the image processing parameters of the lens and the display screen, so as to implement the quality improvement of the original image according to various objective factors in the process of forming the original image.

The image processing method provided by the embodiments of the present disclosure may obtain the image processing parameters corresponding to the camera module after obtaining the original image through the camera module. Then, the original image is divided based on the plurality of processing regions to obtain a plurality of the image regions to be processed. In the process of compensation processing for the image region to be processed corresponding to the processing parameters, objective influences of the image processing parameters of the camera module of the original image acquisition process are fully considered, as such, the compensation processing is more pertinence. After the compensation process is completed and the area image compensation result is obtained, the target image may be obtained based on the image compensation result of each image region, so that the image quality of the target image is fundamentally improved.

Figure 9:
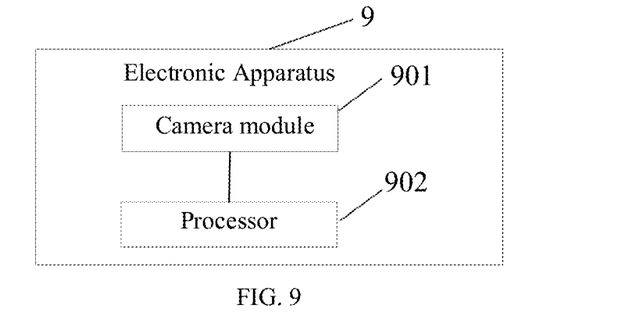
FIG. 9 illustrates a schematic structural diagram of an electronic apparatus according to some embodiments of the present disclosure

Based on the above-described embodiment, embodiments of the present disclosure also provide an electronic apparatus 9. FIG. 9 is a schematic structural diagram of the electronic apparatus 9. As shown in FIG. 9, the electronic apparatus 9 includes a camera module 901 and a processor 902.

The camera module 901 is configured to obtain the original image by sensing the external light of the lens of the camera module. In some embodiments, the original image is formed at the sensor array of the camera module.

The processor 902 is configured to obtain the image processing parameters corresponding to the camera module. In some embodiments, the image processing parameters are configured to compensate the influence of the image quality caused by the camera module.

In some embodiments, the image processing parameters may include the plurality sets of processing parameters. Each processing parameter includes the plurality of the processing data. The plurality sets of processing parameters and the plurality of the processing regions have a first corresponding relationship.

The processor 902 may further be configured to process the original image to obtain the target image based on the image processing parameters. Wherein, the image quality of the target image is higher than the image quality of the original image.

The processor 902 is configured to divide the original image to obtain the plurality of image regions to be processed based on the plurality of processing regions.

The processor 902 is further configured to perform compensation processing on the image area to be processed corresponding to the processing parameter based on the processing parameter to obtain an area image compensation result and obtain a target image based on the image compensation result of each area.

In some embodiments, the process 902 is configured to obtain the brightness parameters of the external environment brightness.

The processor 902 is further configured to obtain the image processing parameter of the first combination corresponding to the camera module. In some embodiments, the image processing parameter of the first combination includes the plurality sets of processing parameters.

If the brightness parameter is less than or equal to a brightness threshold, the processor 902 may be further configured to obtain the image processing parameters of the second combination corresponding to the camera module. In some embodiments, the image processing parameter of the second combination includes the plurality sets of processing parameters. The number of the processing regions corresponding to the image processing parameters of the second combination is greater than the number of the processing regions corresponding to the image processing parameters of the first combination.

In some embodiments, the field of view of the lens and the plurality of processing parameters have a second corresponding relationship.

In some embodiments, if the camera module is located below the display screen, the image processing parameters are further configured to compensate the influence of the image quality caused by a part of the physical structure of the display screen corresponding to the camera module.

In some embodiments, the processing region is the physical region of the sensor array.

The processor 902 is configured to obtain the gradient information of the image processing parameters.

The processor 902 may be further configured to divide the sensor array based on the gradient information of the image processing parameters to obtain the processing regions.

In some embodiments, the image processing parameters may include a first optical processing parameter and a second optical processing parameter. The first optical processing parameter is the processing parameter of the lens corresponding to the external light. The second optical processing parameter is the processing parameter of the physical assembly covering the lens with respect to the external light.

The processor 902 may be configured to obtain the first gradient information of the first optical processing parameter and the second gradient information of the second optical processing parameter.

The processor 902 may be further configured to obtain the gradient information of the image processing parameter based on the first gradient information and the second gradient information.

In some embodiments, the processing region is the physical region of the sensor array, and the method further includes the following.

The processor 902 may be configured to obtain the structure parameter of the camera module. In some embodiments, the structure parameter at least includes the distance range between the camera assembly of the camera module and the sensor arrays.

The processor 902 may be further configured to divide the sensor array based on the structure parameter of the camera module to obtain the processing regions.

In some embodiments, the processing regions are physical regions of the sensor array.

The processor 902 may be further be configured to obtain the calculation load parameter and the image display parameter. Wherein, the calculation load parameter may include the calculation throughput of the electronic apparatus to which the camera module belongs. The image display parameter includes the resolution parameter of the display module of the electronic apparatus.

The processor 902 may be further configured to the sensor array into processing regions based on the calculation load parameter and/or image resolution parameter.

The above-described processor 902 may be at least one of application-specific integrated circuits ASIC, DSP, DSPD, PLD, FPGA, CPU, controller, microcontroller, or microprocessor. The electronic device configured to implement the above-described processing function may also include others, which is not limited to the embodiment of the present disclosure.

In some embodiments, the electronic apparatus provided by the embodiments of the present disclosure may obtain image processing parameters corresponding to the camera module and perform compensation on the original image obtained through the camera module according to the processing parameters processing, so as to obtain the target image, thereby improving the image quality of the image relative to the original image. Therefore, since the image processing parameter of the camera module are directly related to the original image formation process and directly affect the image quality of the original image, the original image formation process may be objectively improved by processing the original image through the image processing parameters, thereby fundamentally realizing a substantial improvement in the image quality of the original image.

Embodiments of the present disclosure further provide a computer-readable storage medium. Computer program is stored at the computer-readable storage medium. When the computer program is executed by a processor, the image processing method described above may further be implemented.

The above description of the various embodiments tends to emphasize the differences between the various embodiments, and the same or similarities may be referred to each other. For the brevity, the details are not repeated herein.

The methods described in each method embodiments provided in the present disclosure may be combined arbitrarily without conflict to obtain new method embodiments.

The features described in the product embodiments provided in the present disclosure may be combined arbitrarily without conflict to obtain new product embodiments.

The features described in each method or device embodiment provided in the disclosure may be combined arbitrarily without conflict to obtain a new method embodiment or device embodiment.

In some embodiments, the above-described computer-readable storage medium may include a read-only memory (ROM), a programmable read-only memory (PROM), an erasable programmable read-only memory (EPROM), an electrically erasable programmable read-only memory (EEPROM), a ferromagnetic random-access memory (FRAM), a flash memory, a magnetic surface memory, a CD, or a compact disc read-only memory (CD-ROM), etc. The above computer-readable storage medium may further include a variety of electronic apparatuses including one or any combination of the above-described memories, such as mobile phones, computers, tablet devices, and personal digital assistants, etc.

In some embodiments, the terms "include", "contain" or any other variants thereof are intended to cover non-exclusive inclusion, such that a process, a method, an article or a device including a series of elements not only includes those elements, but also includes other elements not explicitly listed, or elements inherent to the process, the method, the article, or the device. Without more restrictions, the element defined by the sentence "including a . . . " does not exclude the existence of other identical elements in the process, the method, the article, or the device that includes the element.

The numbers of the above embodiments of the present disclosure are for description only and do not represent the advantages and disadvantages of the embodiments.

Through the description of the above embodiments, those skilled in the art may clearly understand that the method of the above embodiments may be implemented by means of software plus necessary general hardware nodes. The method may also be implemented by hardware, but in many cases, the former is a better implementation manner. The technical solution of this application essentially or the part that contributes to the existing technology can be embodied in the form of a software product, and the computer software product stored in a storage medium (such as ROM/RAM, magnetic disk, optical disc) includes several instructions to enable a terminal device (such as the mobile phone, the computer, the server, an air conditioner, or a network device, etc.) to execute the methods described in the various embodiments of the present disclosure.

Embodiments of the present disclosure are described regarding flowcharts and/or block diagrams of methods, devices (systems), and computer program products. In some embodiment, each process and/or block of the flowchart and/or block diagram, and the combination of processes and/or blocks in the flowchart and/or block diagram may be implemented by computer program instructions. The computer program instruction is provided to the processor of a general-purpose computer, a special-purpose computer, an embedded processor, or other programmable data processing equipment to produce a machine, so that the instructions executed by the processor of the computer or other programmable data processing equipment are configured for implementing the functions specified in one flow or a plurality of flows in the flowchart and/or one block or multiple blocks in the block diagram.

The computer program instructions may also be stored in a computer-readable memory that can direct a computer or other programmable data processing equipment to work in a specific manner so that the instructions stored in the computer-readable memory produce an article of manufacture including the instruction device. The device implements the functions specified in one process or multiple processes in the flowchart and/or one block or multiple blocks in the block diagram.

These computer program instructions may also be loaded on a computer or other programmable data processing equipment, so that a series of operation processes are executed on the computer or other programmable equipment to produce computer-implemented processing, so as to execute on the computer or other programmable equipment. The instructions provide steps for implementing the functions specified in one process or multiple processes in the flowchart and/or one block or multiple blocks in the block diagram.

The above are only preferred embodiments of the present disclosure and do not limit the scope of this application. Any equivalent structure or equivalent process transformation made using the content of the description and drawings of the disclosure, or directly or indirectly used in other related technical fields are also included in the scope of patent protection of the present disclosure.

What is claimed is:

1. An information processing method, comprising:
obtaining an original image, wherein the original image is a sensing-signal-array formed at a sensor array of a camera module in response to an external light passing through a lens of the camera module;
obtaining an image processing parameter corresponding to the camera module, wherein the image processing parameter is configured to compensate an influence on an image quality of the original image caused by the camera module, and configured to determine a portion of the original image as a target region of the original image; and
processing the original image to obtain a target image based on the image processing parameter, wherein an image quality of the target image is higher than the image quality of the original image, and processing the original image based on the image processing parameter to obtain the target image includes performing a compensation processing on the target region of the original image.

2. The method of claim 1, wherein:
the image processing parameter includes a plurality sets of processing parameters, wherein each set of the processing parameters includes a plurality of processing data, and the plurality sets of processing parameters and a plurality of processing regions have a first corresponding relationship; and
processing the original image based on the image processing parameter to obtain the target image comprises:
obtaining a plurality of image regions based on dividing the original image according to the plurality of processing regions;

obtaining an image compensation result for each image region based on performing a compensation processing on the image region according to a corresponding set of the processing parameters; and obtaining the target image based on the image compensation result of each image region.

3. The method of claim 2, further comprising:
obtaining a brightness parameter that represents a brightness of an external environment;
wherein obtaining the image processing parameter corresponding to the camera module comprises:
if the brightness parameter is greater than a brightness threshold, obtaining image processing parameters of a first combination corresponding to the camera module, wherein the image processing parameters of the first combination include the plurality sets of processing parameters;
if the brightness parameter is less than or equal to the brightness threshold, obtaining image processing parameters of a second combination corresponding to the camera module, wherein the image processing parameters of the second combination include the plurality sets of processing parameters;
wherein a number of processing regions corresponding to the image processing parameters of the second combination is greater than a number of processing regions corresponding to the image processing parameters of the first combination.

4. The method of claim 2, wherein:
a field of view of the lens and the plurality sets of processing parameters have a second corresponding relationship.

5. The method of claim 1, wherein, if the camera module is located under a display screen, the image processing parameter is further configured to compensate for the influence on the image quality caused by a physical structure of a portion of the display screen corresponding to the camera module.

6. The method of claim 2, wherein:
the plurality of processing regions are physical regions of the sensor array; and
the method further comprises:
obtaining gradient information of the image processing parameter; and
dividing the sensor array based on the gradient information of the image processing parameter, to obtain the plurality of processing regions.

7. The method of claim 6, wherein:
the image processing parameter includes a first optical processing parameter and a second optical processing parameter;
the first optical processing parameter is a processing parameter of the lens for the external light;
the second optical processing parameter is a processing parameter of a physical component covering the lens for the external light; and
obtaining the gradient information of the image processing parameter comprises:
obtaining a first gradient information of the first optical processing parameter and a second gradient information of the second optical processing parameter; and
obtaining the gradient information of the image processing parameter based on the first gradient information and the second gradient information.

8. The method of claim 2, wherein the plurality of processing regions are physical regions of the sensor array; and the method further comprises:
obtaining a structure parameter of the camera module, wherein:
the structure parameter of the camera module at least includes a distance range between a camera assembly of the camera module and the sensor array; and
dividing the sensor array based on the structure parameter of the camera module, to obtain the plurality of processing regions.

9. The method of claim 2, wherein the plurality of processing regions are physical regions of the sensor array; and the method further comprises:
obtaining a calculation load parameter and an image display parameter, wherein the calculation load parameter includes a calculation throughput of an electronic apparatus to which the camera module belongs, and the image display parameter includes a resolution parameter of a display module of the electronic apparatus; and
dividing the sensor array based on the calculation load parameter and/or the image resolution parameter, to obtain the plurality of processing regions.

10. An electronic apparatus, comprising:
a camera module configured to obtain an original image in response to an external light passing through a lens of the camera module, the original image being formed at a sensor array of the camera module; and
a processor configured to:
obtain an image processing parameter corresponding to the camera module, wherein the image processing parameter is configured to compensate an influence on an image quality of the original image caused by the camera module, and configured to determine a portion of the original image as a target region of the original image; and
process the original image to obtain a target image based on the image processing parameter, wherein an image quality of the target image is higher than the image quality of the original image, and when processing the original image, the processor is further configured to perform a compensation processing on the target region of the original image.

11. The apparatus of claim 10, wherein:
the image processing parameter includes a plurality sets of processing parameters, wherein each set of the processing parameters includes a plurality of processing data, and the plurality sets of processing parameters and a plurality of processing regions have a first corresponding relationship; and
when processing the original image, the processor is further configured to:
obtain a plurality of image regions based on dividing the original image according to the plurality of processing regions;
obtain an image compensation result for each image region based on performing a compensation processing on the image region according to a corresponding set of the processing parameters; and
obtain the target image based on the image compensation result of each image region.

12. The apparatus of claim 11, wherein the processor is further configured to:
obtain a brightness parameter that represents a brightness of an external environment; and if the brightness parameter is greater than a brightness threshold, obtain image processing parameters of a first combination corresponding to the camera module, wherein the image processing parameters of the first combination include the plurality sets of processing parameters;

if the brightness parameter is less than or equal to the brightness threshold, obtain image processing parameters of a second combination corresponding to the camera module, wherein the image processing parameters of the second combination include the plurality sets of processing parameters;

wherein a number of processing regions corresponding to the image processing parameters of the second combination being greater than a number of processing regions corresponding to the image processing parameters of the first combination.

13. The apparatus of claim 11, wherein:
a field of view of the lens and the plurality sets of processing parameters have a second corresponding relationship.

14. The apparatus of claim 10, wherein, if the camera module is located under a display screen, the image processing parameter is further configured to compensate the influence on the image quality caused by a physical structure of a portion of the display screen corresponding to the camera module.

15. The apparatus of claim 11, wherein:
the plurality of processing regions are physical regions of the sensor array; and
the processor is further configured to:
  obtain gradient information of the image processing parameter; and
  divide the sensor array based on the gradient information of the image processing parameter, to obtain the plurality of processing regions.

16. The apparatus of claim 15, wherein:
the image processing parameter includes a first optical processing parameter and a second optical processing parameter;
the first optical processing parameter is a processing parameter of the lens for the external light;
the second optical processing parameter is a processing parameter of a physical component covering the lens for the external light; and
the processor is further configured to:
  obtain a first gradient information of the first optical processing parameter and a second gradient information of the second optical processing parameter; and
  obtain the gradient information of the image processing parameter based on the first gradient information and the second gradient information.

17. The apparatus of claim 11, wherein the plurality of processing regions are physical regions of the sensor array; and the processor is further configured to:
obtain a structure parameter of the camera module, wherein: the structure parameter of the camera module at least includes a distance range between a camera assembly of the camera module and the sensor array; and
divide the sensor array based on the structure parameter of the camera module, to obtain the plurality of processing regions.

18. The apparatus of claim 11, wherein the plurality of processing regions are physical regions of the sensor array; and the processor is further configured to:
obtain a calculation load parameter and an image display parameter, wherein the calculation load parameter includes a calculation throughput of an electronic apparatus to which the camera module belongs, and the image display parameter includes a resolution parameter of a display module of the electronic apparatus; and
divide the sensor array based on the calculation load parameter and/or the image resolution parameter, to obtain the plurality of processing regions.

19. An information processing method, comprising:
obtaining an original image, wherein the original image is a sensing-signal-array formed at a sensor array of a camera module in response to an external light passing through a lens of the camera module;
obtaining an image processing parameter corresponding to the camera module, wherein the image processing parameter is configured to compensate an influence on an image quality of the original image caused by the camera module, the image processing parameter includes a plurality sets of processing parameters, wherein each set of the processing parameters includes a plurality of processing data, and the plurality sets of processing parameters and a plurality of processing regions have a first corresponding relationship; and
processing the original image to obtain a target image based on the image processing parameter, wherein an image quality of the target image is higher than the image quality of the original image, and processing the original image based on the image processing parameter to obtain the target image includes:
  obtaining a plurality of image regions based on dividing the original image according to the plurality of processing regions;
  obtaining an image compensation result for each image region based on performing a compensation processing on the image region according to a corresponding set of the processing parameters; and
  obtaining the target image based on the image compensation result of each image region.

* * * * *